(12) United States Patent
Vieux

(10) Patent No.: US 10,528,046 B2
(45) Date of Patent: Jan. 7, 2020

(54) AIRCRAFT AUTOPILOT SYSTEM AND METHOD, AND AN AIRCRAFT

(71) Applicant: AIRBUS HELICOPTERS, Marignane (FR)

(72) Inventor: Thierry Vieux, Carry le Rouet (FR)

(73) Assignee: AIRBUS HELICOPTERS, Marignane (FR)

( * ) Notice: Subject to any disclaimer, the term of this patent is extended or adjusted under 35 U.S.C. 154(b) by 79 days.

(21) Appl. No.: 15/891,498

(22) Filed: Feb. 8, 2018

(65) Prior Publication Data

US 2018/0224848 A1 Aug. 9, 2018

(30) Foreign Application Priority Data

Feb. 8, 2017 (FR) ..................................... 17 00133

(51) Int. Cl.
*G05D 1/00* (2006.01)
*B64C 39/02* (2006.01)
*G05D 1/02* (2006.01)

(52) U.S. Cl.
CPC ......... *G05D 1/0061* (2013.01); *B64C 39/024* (2013.01); *G05D 1/0022* (2013.01); *G05D 1/0202* (2013.01); *B64C 2201/141* (2013.01); *B64C 2201/146* (2013.01)

(58) Field of Classification Search
CPC .. G05D 1/0061; G05D 1/0077; G05D 1/0022; G05D 1/0202; B64C 39/024;
(Continued)

(56) References Cited

U.S. PATENT DOCUMENTS 3,493,836 A * 2/1970 Nelson ................. G05D 1/0077
318/565
3,807,666 A * 4/1974 Devlin ................. G05D 1/0077
244/194
(Continued)

FOREIGN PATENT DOCUMENTS

| CN | 102915038 A | | 2/2013 |
| CN | 104914872 | * | 9/2015 |
| CN | 104914872 A | | 9/2015 |

(Continued)

OTHER PUBLICATIONS

MP21283X Micropilot's Triple Redundant UAV Autopilot, Micropilot Inc., May 28, 2015, 10 pages.
European Search Report for Application No. EP18151571, dated Apr. 27, 2018, 11 pages.
(Continued)

*Primary Examiner* — Muhammad Shafi
(74) *Attorney, Agent, or Firm* — Brooks Kushman P.C.

(57) ABSTRACT

An autopilot system comprising an onboard unit. The onboard unit has a plurality of sets of sensors that are redundant and mutually independent, together with a plurality of calculation channels, each calculation channel being connected to the sensors of one of the sets of sensors and receiving data coming from the sensors. A supervisor is connected to the sensors of a set of sensors, the supervisor having the function of coupling at most one of the calculation channels to the control members, the supervisor having the function of decoupling the coupled channel from the control members in the event that the current behavior of the aircraft departs from predetermined predicted behavior.

18 Claims, 1 Drawing Sheet

(58) Field of Classification Search
CPC ........ B64C 2201/165; B64C 2201/141; B64C 2201/146
USPC .......................................................... 701/11
See application file for complete search history.

(56) References Cited

U.S. PATENT DOCUMENTS

| | | | | |
|---|---|---|---|---|
| 4,644,538 | A * | 2/1987 | Cooper | G05D 1/0077 700/79 |
| 8,515,593 | B2 | 8/2013 | Marty et al. | |
| 2007/0164166 | A1 * | 7/2007 | Hirvonen | G05D 1/0077 244/175 |

FOREIGN PATENT DOCUMENTS

| | | |
|---|---|---|
| EP | 2924529 A1 | 9/2015 |
| EP | 3043264 A1 | 7/2016 |
| FR | 2958418 A1 | 10/2011 |
| WO | 8400071 A1 | 1/1984 |
| WO | 2016193884 A1 | 12/2016 |

OTHER PUBLICATIONS

Singapore Written Opinion for Application No. 10201800504W, dated May 17, 2018, 7 pages.
Singapore Search Report for Application No. 10201800504W, dated May 8, 2018, 3 pages.
French Search Report for French Application No. FR 1700133, Completed by the French Patent Office, dated Oct. 30, 2017, 10 pages.

* cited by examiner

AIRCRAFT AUTOPILOT SYSTEM AND METHOD, AND AN AIRCRAFT

CROSS-REFERENCE TO RELATED APPLICATIONS

This application claims priority to French patent application No. FR 17 00133 filed on Feb. 8, 2017, the disclosure of which is incorporated in its entirety by reference herein.

BACKGROUND OF THE INVENTION

(1) Field of the Invention

The present invention relates to a system and a method for automatically piloting an aircraft, and to an aircraft provided with the system. For example, such an aircraft may be a rotorcraft, and/or a pilotless aircraft known as an unmanned aerial vehicle (UAV).

2) Description of Related Art

Conventionally, an aircraft includes piloted members. The piloted members enable the movement of the aircraft in three-dimensional space to be controlled. The piloted members may comprise at least one engine, blades of a rotor, and possibly a rotor that contributes at least in part to providing the aircraft with propulsion and/or lift, flaps, and for example a flap arranged on a tailplane or tail fin referred to respectively as an elevator or a rudder, . . . .

The term "piloted member" as used below thus designates any member that makes it possible to modify the position of the aircraft in three-dimensional space, which members may possibly be aerodynamic members.

An aircraft, and in particular a pilotless aircraft, may include an autopilot system enabling the aircraft to be guided along a programmed path.

Such an autopilot system may comprise control members that control the piloted members. Under such circumstances, the autopilot system includes a computer that controls the control members as a function of flight data measured by various sensors. By way of example, the computer may control the power developed by an engine, possibly by controlling a system for injecting fuel into the engine. The computer may also control actuators that control the positions of aerodynamic control surfaces in the reference frame of the aircraft. For example, the actuators may set the pitch of the blades of at least one rotor that contributes at least in part to providing the aircraft with lift and/or propulsion. Actuators may also set the angle of incidence of at least one flap, e.g. arranged on a wing, on a tailplane, on a tail fin, . . . .

The computer can control the control members as a function of various constraints, such as movement setpoints for roll/pitching/yaw and thrust in order to follow a stored path.

On a heavy aircraft carrying a crew, autopilot systems may be sufficiently robust to comply with the design and implementation standards in force for authorizing flight, in particular over a population. The equipment making up such an autopilot system must then present high levels of reliability/safety, where such levels of reliability/safety are sometimes referred to as development assurance levels (DALs). Such autopilot systems can then present weight that is considerable, but reasonable given the total weight of the aircraft.

For a lightweight pilotless aircraft, the autopilot systems are lighter in weight. The autopilot systems can then made up of equipment having lower reliability/safety levels. Such autopilot systems can encounter difficulties in complying with design and implementation standards. The component elements of certain autopilot systems enable a pilotless aircraft to be guided over a programmed path, but are not necessarily compatible in terms of reliability and of safety with the standards that need to be complied with in order to fly under civil aviation regulations. A commercial flight of such an aircraft over a population is then likely not to be authorized.

Document FR 2 958 418 describes a system for managing a pilotless aircraft. That document illustrates a system having a ground station and a pilotless aircraft.

That system provides a function of constructing a flight plan, a function of constructing a path, and a guidance function enabling guidance setpoints to be generated. In variants, certain functions may be performed by the ground station or by an autopilot system of the aircraft. Furthermore, the autopilot system performs a control function by preparing control signals for controlling the aircraft on the basis of guidance setpoints.

Documents U.S. Pat. No. 4,644,538, US 2007/164166, and WO 2016/193884 are also known. Document US 2007/164166 is particularly remote from the invention since it relates to a so-called "fly-by-wire" electrical control system and not to an autopilot system.

BRIEF SUMMARY OF THE INVENTION

An object of the present invention is thus to propose an innovative autopilot system tending to present high levels of reliability and safety, e.g. in order to comply with the standards established for civil aviation.

The present invention thus provides an autopilot system for an aircraft, e.g. an aircraft without a human pilot, the autopilot system comprising an onboard unit for mounting on board said aircraft, the onboard unit comprising at least one control member for controlling at least one piloted member of said aircraft to control a movement of the aircraft.

The onboard unit comprises:

a plurality of sets of sensors that are redundant and mutually independent, each set of sensors comprising sensors for evaluating the position of the aircraft and the movement of the aircraft;

a plurality of calculation channels that are redundant and mutually independent, each calculation channel being connected to the sensors of one of said sets of sensors and receiving data coming from those sensors; and a supervisor connected to the sensors of a set of sensors, the supervisor having the function of coupling at most one of said calculation channels to said at least one control members, the coupled calculation channel being referred to as the "engaged" channel and serving to generate control signals that are transmitted to the at least one control member as a function of the received data, said supervisor having the function of decoupling said engaged channel from the control members when the current behavior of the aircraft departs from a predetermined predicted behavior.

The term "a plurality of sets of sensors that are redundant and mutually independent" means that the autopilot system has at least two or indeed at least three sets of sensors. These sets of sensors are redundant in the sense that the sets of sensors determine at least the same data. These sets of sensors are also independent in the sense that each set of sensors has no need for any other set of sensors in order to operate.

The term "a plurality of calculation channels that are redundant and mutually independent" is used to mean that the autopilot system has at least two calculation channels. These calculation channels are redundant in the sense that the calculation channels determine at least the same types of control signals. These calculation channels are also independent in the sense that each calculation channel has no need of any other calculation channel in order to operate, and may does not communicate with the other calculation channels.

For example, each calculation channel may comprise a computer.

Alternatively, the calculation channels may represent distinct channels within a single computer. The calculation channels may optionally be represented by respective electronic cards in a computer, each electronic card representing a single calculation channel.

Furthermore, the control members may comprise at least one of the following members: an actuator, e.g. suitable for acting on a power transmission train connected to at least one piloted member, a fuel injection system, . . . .

Furthermore, the autopilot system has a supervisor. The supervisor may be an independent computer, or indeed a subassembly of a computer including said calculation channels.

At all times, the supervisor puts a maximum of one single calculation channel into communication with the control members. The control members are controlled by only that one of the calculation channels that is coupled to the control members, which channel is referred to as the "engaged" channel.

In the event of a calculation channel malfunctioning, the supervisor connects another calculation channel to the control members. If all of the calculation channels are in a malfunctioning state, the supervisor in turn may possibly control the control members. Under such circumstances, a failure of the first engaged channel or the associated set of sensors is not catastrophic for the aircraft, since at least one other calculation channel can be engaged as a replacement.

A failure of the engaged channel or of the associated set of sensors may be detected by the supervisor, and/or by a remote station, by comparing the current behavior of the aircraft with stored predicted behavior, e.g. stored before the flight. In this variant, the path of the aircraft is deterministic, with the aircraft performing a programmed movement under the control of the engaged channel. Detecting a departure from the path raises doubts as to the integrity of the engaged channel, so the engaged channel is taken out of operation and replaced by another calculation channel.

The aircraft is thus controlled/guided by a plurality of calculation channels, only one of which is coupled to the control members, and for example to the motors of the aircraft, under the monitoring of the supervisor. As a result, only one calculation channel can generate a signal for controlling the control members at any one time.

This autopilot system thus separates the "piloting" function as performed by the calculation channels under normal conditions, and the "supervision" function as performed by the supervisor. In the event of a failure of the supervisor, the engaged channel continues to guide the aircraft.

This autopilot system thus presents a combination of multiple elements that may have different respective levels for regulatory requirements. Some of the members of the autopilot system may thus be required to have a relatively low level of reliability/safety, while others may be required to have a relatively high level of reliability/safety. This combination and the method that is applied make it possible to achieve an overall architecture that tends to obtain a high requirement level in spite of the presence of members that present a medium safety requirement level.

Specifically, the supervisor is made in such a manner as to present a high level of safety/reliability so as to guarantee one or more of the following functions: monitoring of the sensors, creating a consolidated sensor reference, selecting the appropriate calculation channel, excluding the engaged channel in the event of a failure being declared, monitoring envelope of the flight being followed, monitoring the predicted behavior of the aircraft, performing an emergency mode in the event of all of the calculation channels failing.

Conversely, the calculation channels and the sets of sensors may be of a known type, and may individually present respective levels of reliability and safety that are lower insofar as these members are redundant and monitored by the supervisor. It is thus possible to envisage using calculation channels and sets of sensors that are relatively compact.

The overall requirement level in terms of safety is finally achieved by using different members, by using a redundant architecture, and by installing monitoring of the system by a supervisor. An autopilot system that is light in weight but that presents a relatively high level of reliability/safety can thus be envisaged, in particular for a pilotless aircraft of small dimensions.

The autopilot system may present an economic advantage by using components having a level of requirements that is low in comparison with equipment having a high level of reliability/safety.

Furthermore, the autopilot system may optionally make use of commercially available components, thereby making it easier to implement.

The autopilot system may include one or more of the following characteristics.

For example, each set of sensors may be connected to a single calculation channel or solely to the supervisor.

A minimalist embodiment may have two calculation channels with their respective sets of sensors, together with a supervisor and its own set of sensors.

The supervisor may establish a consolidated positioning and movement reference frame for the aircraft on the basis of analyzing the consistency of the various sensors.

By way of example, in the presence of three satellite positioning systems, the supervisor can estimate the position of the aircraft by a conventional voting method. The same applies for the movements of the aircraft.

In another aspect, each set of sensors may include a positioning system for positioning said aircraft in the terrestrial reference frame, together with an inertial unit.

In another aspect, the autopilot system may include a remote unit that is not for mounting on board the aircraft, the remote unit having a computer in communication with the supervisor via a wireless link.

The remote unit may serve to monitor the position and the movements of the aircraft in order to detect an anomaly, and/or may be capable of controlling the control members via the supervisor.

In another aspect, the remote unit may include a positioning device for determining the position and the movement of the onboard unit.

For example, the remote unit may comprise a radar watching the movements of the aircraft.

In a variant, the current behavior of the aircraft is monitored at a remote unit, e.g. a ground station, that presents a high level of reliability/safety. If the remote unit detects a departure from the path or a path that is erratic, the remote unit may inform the supervisor via a wireless link, e.g. a radio link, telling it to exclude the engaged channel and then switch over to a sound calculation channel. If necessary, the remote unit may take charge of piloting the aircraft.

The invention also provides an aircraft provided with at least one piloted member that controls a movement of the aircraft. The aircraft then includes an autopilot system of the invention, with the onboard unit being on board the aircraft.

The aircraft may include one or more of the following characteristics.

Thus, the aircraft may be an aircraft without an onboard pilot, there being no pilot on board the aircraft, or indeed there may be no pilot piloting the aircraft.

In another aspect, the piloted members may comprise at least one of the following members: a motor; and an aerodynamic control surface that is movable relative to a reference frame of the aircraft.

The invention also provides an autopilot method, e.g. implemented by an autopilot system of the invention.

This method performs the following steps during a current flight of the aircraft:

controlling the progress of the aircraft using one of said calculation channels referred to as the "engaged" channel, said engaged channel being coupled to said piloted members in order to control the piloted members;

monitoring the current behavior of the aircraft relative to preprogrammed predicted behavior; and when said current behavior departs from said predicted behavior, said supervisor decouples said engaged channel from said piloted members, and providing at least one calculation channel has not been engaged during said current flight, said supervisor couples a calculation channel that has not been engaged during said flight with said piloted members, said calculation channel newly coupled to the piloted members becoming in turn said engaged channel.

The term "current flight" may designate a stage going from turning on the motors of the aircraft to stopping them.

In this method, in the presence of unexpected behavior of the aircraft, the supervisor disengages the engaged channel and, where appropriate, exchanges it for another calculation channel.

The method may include one or more of the following characteristics.

For example, each set of sensors may determine data including the position of the aircraft and movement parameters illustrating/defining the movement of the aircraft, and said supervisor may determine a consolidated position and consolidated movement parameters by analyzing the consistency of said positions and said movement parameters supplied by the sensors of the sets of sensors.

For example, each set of sensors includes a satellite positioning system providing the position of the aircraft. The position of the aircraft is then expressed by a latitude and a longitude together with a height, for example.

Furthermore, an inertial unit may provide movement parameters of the aircraft, such as roll, pitching, and yaw angles of the aircraft, angular speeds/accelerations, and also horizontal and vertical speeds/accelerations.

Using conventional analyses, the supervisor receives the various measured data values and deduces therefrom a consolidated position and consolidated movement parameters. A consolidated reference frame of the sensors that is consolidated by using voting with at least three sets of sensors can make it possible to ignore a set of sensors that has failed.

In another aspect, said current behavior may be monitored by the supervisor using the consolidated position and the consolidated movement parameters.

In another aspect, the predicted behavior may define a path that is to be followed and limits for the movement parameters that are not to be exceeded, the current behavior being found to depart from the predicted behavior when the aircraft no longer follows said path and/or at least one of said limits is no longer complied with.

By way of example, each calculation channel is programmed so that the aircraft operates in a flight envelope with attitude and angular speed/acceleration limits and also horizontal and vertical speed/acceleration limits. If any of these limits is exceeded, the engaged channel is de-selected by the supervisor. Appropriately selecting the limits makes it possible to anticipate the fact that the aircraft is in a situation in which it will be difficult for the newly-engaged channel to keep the aircraft in flight.

In another aspect, the current behavior may be monitored by a remote unit situated away from the aircraft, the remote station informing the supervisor if the engaged channel needs to be decoupled from the control members.

In another aspect, the supervisor may include a hierarchical list of the calculation channels and said supervisor selects a calculation channel that is to become the engaged channel by using said hierarchical list.

For example, the supervisor initially couples the first calculation channel in the list with the control members. If the supervisor disengages this first calculation channel, the supervisor couples secondly the second calculation channel in the list, and so on.

In another aspect, when the supervisor has decoupled all of the calculation channels during the current flight, the supervisor may apply an emergency mode in which it itself controls said control members in order to cause the aircraft to hover while waiting for piloting from a remote unit that is not present in the aircraft, said remote unit communicating with said supervisor in order to pilot the aircraft.

An emergency mode may be activated in the event of all of the calculation channels failing, or in the event of departing from the flight envelope in a manner that cannot be recovered by a normal stabilization method.

The emergency mode may enable the vehicle to be recovered in the event of an abnormal attitude, e.g. by causing it to hover while level and while waiting for the remote unit to take over.

Optionally, when the supervisor has decoupled all of the calculation channels in a single flight, the supervisor may control said piloted members in order to follow a preprogrammed procedure.

An emergency mode may be activated in the event of all of the calculation channels failing so that the supervisor applies an automatic procedure that is programmed in the supervisor. With such an automatic procedure, the supervisor can pilot the aircraft so as to make it descend at a controlled speed towards an emergency landing zone.

BRIEF DESCRIPTION OF THE DRAWINGS

The invention and its advantages appear in greater detail from the following description of embodiments given by way of illustration and with reference to the accompanying figures, in which.

Elements present in more than one of the figures are given the same references in each of them.

DETAILED DESCRIPTION OF THE INVENTION

Figure 1:
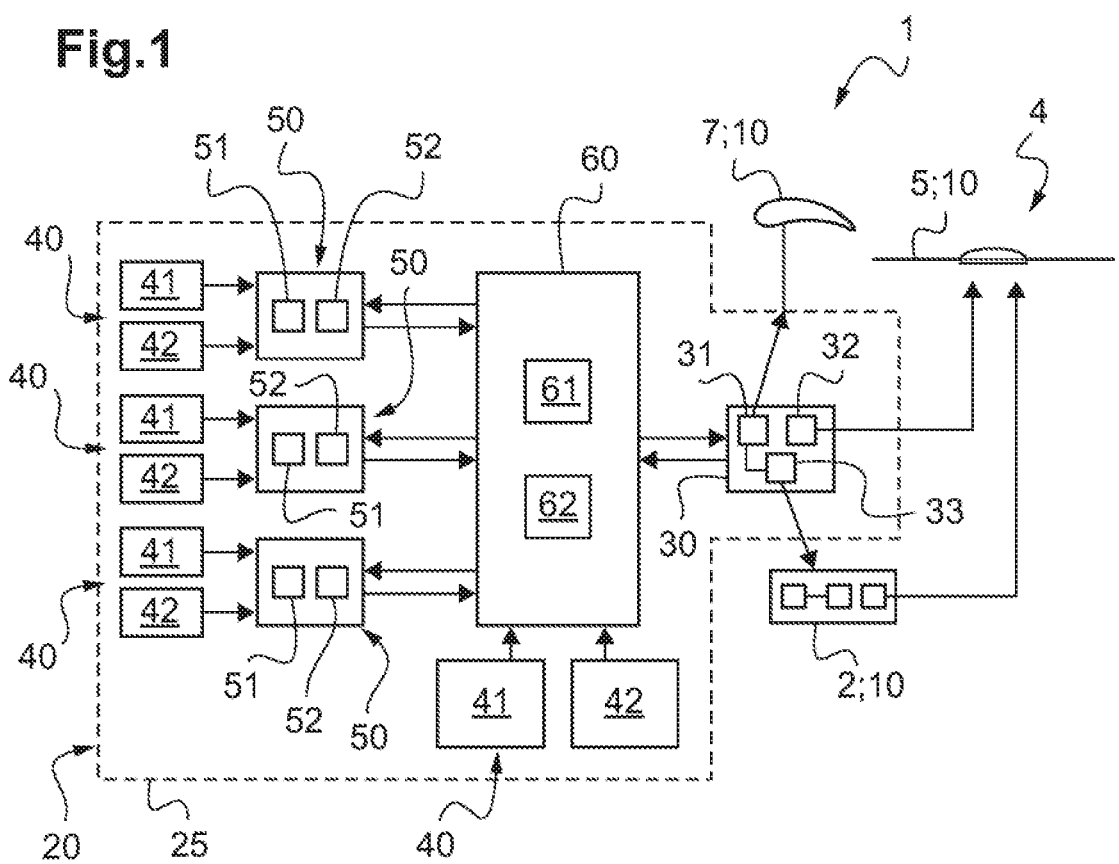
FIG. 1 is a diagram showing an aircraft having an autopilot system.

FIG. 1 shows an aircraft 1 having an autopilot system 20. The aircraft 1 may be an aircraft that is piloted by a human, or indeed an aircraft without a human pilot, i.e. a UAV.

The aircraft 1 may have airfoil surfaces of the type comprising rotor blades 5, a wing, a tailplane, a tail fin, a flap 7, . . . . Furthermore, the aircraft may be provided with motor members 2, of the internal combustion type, of the electric motor type, . . . . For example, the aircraft 1 may have at least one rotor 4 with blades 5, the rotor being driven in rotation by a power plant including at least one motor.

Under such circumstances, the aircraft 1 has at least one or at least two piloted members 10 for controlling movements of the aircraft 1 in three-dimensional space. Such piloted members 10 may include at least one motor 2. In addition, or as an alternative, the piloted members 10 may include at least one airfoil control surface 5, 7 that is movable relative to a reference frame of the aircraft, such as for example a blade 5 of a variable pitch rotor, or a movable flap 7.

Under such circumstances, the autopilot system 20 makes it possible to act on the piloted members without involving a pilot on board the aircraft.

Thus, the autopilot system 20 has an onboard unit 25 present in the aircraft 1. This onboard unit 25 comprises at least one control member controlling at least one piloted member 10. In conventional manner, a control member 30 may be in the form of at least one actuator capable of moving an airfoil control surface, and for example a jack type actuator 31 acting on the angle of incidence of a flap. In addition or as an alternative, a control member 30 may comprise at least one actuator acting on the pitch of a blade, and for example a servo-control 32 moving a blade, optionally via a set of swashplates and a rod. In addition, or as an alternative, a control member 30 may comprise at least one fuel injector system 33 supplying an engine 2 with fuel, or any other system enabling a motor 2 to be controlled.

In general manner, the aircraft may include conventional piloted members and control members without going beyond the ambit of the invention.

Figure 2:
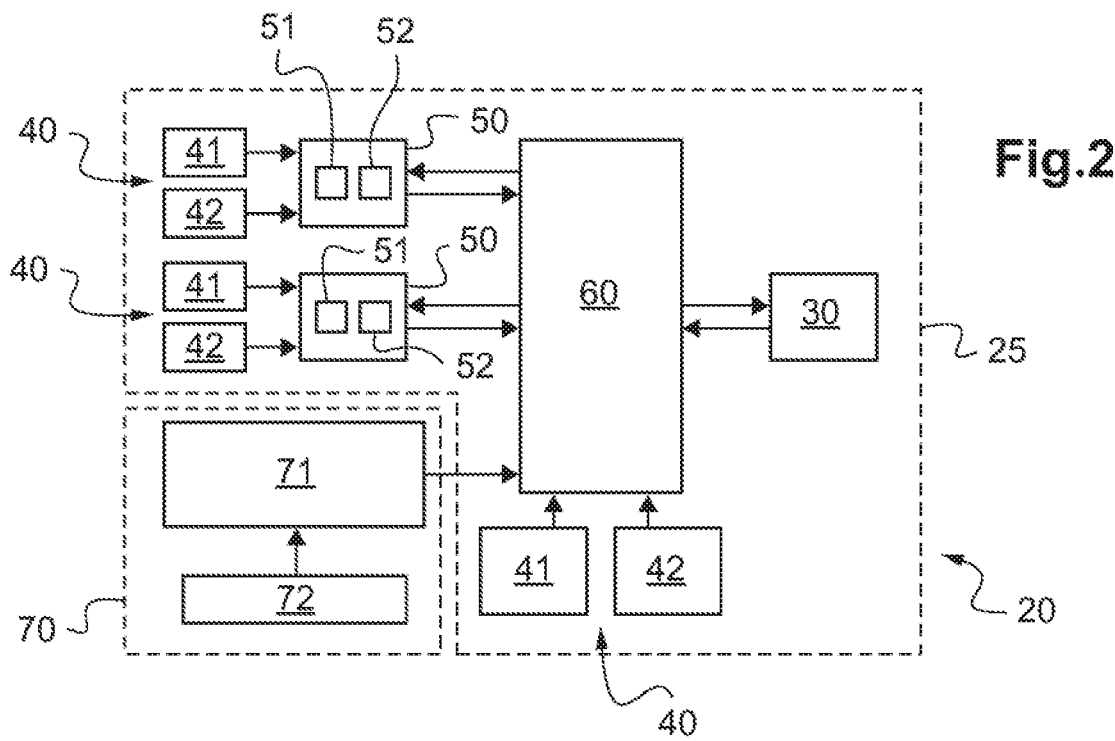
FIG. 2 is a diagram showing an aircraft having an autopilot system provided with an onboard unit and a remote unit.

In addition, the autopilot system 20 has a plurality of mutually independent calculation channels 50, and in particular at least two calculation channels 50. FIG. 1 shows an autopilot system having three calculation channels 50, while FIG. 2 shows an autopilot system having two calculation channels 50.

The term "calculation channel" designates a calculation unit or computer that generates control orders for the control members 30. Thus, each calculation channel can apply a stored algorithm for piloting the aircraft in order to follow a preprogrammed path. The calculation channels may all be intended for transmitting respective signals to the same control members 30.

By way of example, a calculation channel may comprise at least one processor 51 associated with at least one memory 52, at least one integrated circuit, at least one programmable system, at least one logic circuit, these examples not being limiting on the scope to be given by the term "calculation channel".

The calculation channels may be of any known type and may present a moderate level of safety/reliability, such as for example a level known under the acronym DAL.

The respective calculation channels 50 may be independent computers, or they may jointly be portions of a single computer. For example, each calculation channel may be a respective electronic card in a single computer.

In addition, and with reference to FIG. 1, the autopilot system 20 has a plurality of sets of sensors 40 that are redundant and mutually independent. Each set of sensors 40 can possess sensors for evaluating the position of the aircraft 1 and the movement of the aircraft 1. For example, each set of sensors 40 comprises a positioning system 41 for positioning the aircraft 1 in a terrestrial reference frame and an inertial unit 42.

By way of example, each calculation channel 50 is connected to the sensors of a single set of sensors 40 that is dedicated thereto. Thus, each calculation channel can make use of the information transmitted by the associated set of sensors in order to follow a preprogrammed flight plan.

The autopilot system also has a supervisor 60. The supervisor 60 is functionally independent of the calculation channels". The term "supervisor" designates a calculation unit or a computer that is capable in particular of applying a stored algorithm making it possible to ensure that the aircraft follows the path that is preprogrammed in the calculation channels 50.

By way of example, a supervisor 60 may comprise at least one processor 61 associated with at least one memory 62, at least one integrated circuit, at least one programmable system, at least one logic circuit, these examples not limiting the scope to be given to the term "supervisor". The supervisor may present a high level of safety/reliability that is high in the DAL sense, i.e. higher than the level of reliability/safety of the calculation channels 50.

The supervisor 60 may form part of a computer that possesses the calculation channels 50. For example, each calculation channel and the supervisor may be a respective electronic card in a single computer.

The supervisor 60 may also constitute a separate piece of equipment that is distinct from the calculation channels.

The supervisor 60 may be connected to its own set of sensors 40. This set of sensors may also possess a satellite positioning system 41 for positioning the aircraft 1 in the terrestrial reference frame, together with an inertial unit 42. Under such circumstances, each sensor of a set of sensors 40 may be connected to a single calculation channel 50 or solely to the supervisor 60.

In particular, the supervisor 60 serves at all times to couple one of said calculation channels 50 maximally to said control members 30. For example, the supervisor is connected to each calculation channel and to the control members, the supervisor transmitting to the control members 30 only those control signals that are prepared by one of the calculation channels. The control signals prepared by the other calculation channels are ignored.

By way of illustration, each calculation channel 50 may be connected to the control members 30 by a switch or the equivalent. The supervisor 60 then opens all of the switches except for one so as to couple one particular calculation channel to the control members 30.

The coupled calculation channel 50 is said to be the "engaged" channel. This engaged channel thus generates the control signals that are transmitted to the control members 30, these control signals being a function of the data transmitted by the associated set of sensors.

In addition, the supervisor 60 also has the function of decoupling the engaged channel from the control members 30 when the current behavior of the aircraft 1 departs from predetermined predicted behavior and/or when the set of sensors of a calculation channel fails.

In FIG. 1, the supervisor 60 may be programmed to determine whether the current behavior of the aircraft 1 departs from predetermined predicted behavior.

In FIG. 2, this function may be performed by a remote unit 70 that is not on board the aircraft. The remote unit 70 may comprise a computer 71 in communication with said supervisor 60 over a wireless link, such as a radio frequency link, for example. By way of example, the computer 71 may comprise a processor associated with at least one memory, at least one integrated circuit, at least one programmable system, at least one logic circuit, these examples not limiting the scope to be given to the term "computer 71".

The remote unit 70 may also include a positioning device 72 for determining the position and the movement of the onboard unit. For example, the positioning device 72 may comprise a radar.

In addition, or as an alternative, the remote unit 70 may transmit control signals to the supervisor 60, these control signals being transmitted to the piloted members by the supervisor. The aircraft is then piloted remotely from the remote unit.

Independently of the variant, and with reference to FIG. 1, the autopilot system 20 may apply the method of the invention.

In this method, each calculation channel 50 is programmed so that the aircraft 1 follows a particular flight plan. Likewise, the supervisor 60 and/or the remote unit 70, if any, stores the flight plan. The aircraft then needs to present behavior in three-dimensional space that is said to be "predicted" behavior. The term "predicted behavior" may cover stored data and for example a path to be followed and/or limits on movement parameters that are not to be exceeded. These limits may include attitude limits and/or angular speed/acceleration limits and/or horizontal and vertical speed/acceleration limits.

Thus, the calculation channels store the path to be followed, together with movement limits to be complied with. The same applies to the supervisor and/or to the remote unit, if any.

During a flight that can be said to be a "current flight", and for example after programming and activating the autopilot mode, the supervisor 60 couples together a particular one of the calculation channels 50 and the control members 30.

For example, the supervisor 60 stores a hierarchical list of the calculation channels 50. The supervisor 60 then couples the first calculation channel in that list with the control members 30.

The calculation channel that is coupled at any given instant is referred to as the "engaged" channel. The movement of the aircraft is then piloted by the engaged channel.

Under such circumstances, the current behavior of the aircraft 1 is monitored and compared with the preprogrammed predicted behavior. The preprogrammed predicted behavior may be in the form of stored data, such as a stored path to be followed, and/or low and high limits for angular speeds/accelerations to be complied with and/or low and high limits for horizontal and vertical speeds/accelerations to be complied with and/or attitude angle limits to be complied with.

In a first implementation, the current behavior is monitored by the supervisor 60.

For example, the supervisor 60 uses the data transmitted by the sensors 41, 42 of the set of sensors in communication with the supervisor. Using the measured position, the supervisor 60 determines whether the aircraft is following the programmed path, possibly to within some positioning margin. In addition, and using its inertial unit 42, the supervisor 60 verifies that the aircraft is complying with the imposed limits. For example, the supervisor verifies that the low and high limits in terms of angular speeds/accelerations and also the low and high limits in terms of horizontal and vertical speeds/accelerations are being complied with. If so, the supervisor determines that the current behavior is in compliance with the expected predicted behavior.

Alternatively, the supervisor 60 may receive data measured by the sensors of all of the sets of sensors. Using a conventional statistical method, the supervisor 60 can determine a consolidated position and consolidated movement parameters by analyzing the consistency of the positions and the movement parameters supplied by the sensors of the sets of sensors 40. The current behavior is then monitored by the supervisor 60 using the consolidated position and the consolidated movement parameters.

In a second implementation, the current behavior is monitored by the remote unit 70 situated away from the aircraft 1. Where applicable, the remote unit 70 informs the supervisor 60 whether the current behavior is, or is not, in compliance with the predicted behavior.

Whatever the implementation, whenever the current behavior departs from the predicted behavior, the supervisor 60 decouples the engaged channel from the piloted members 10.

Possibly, any calculation channel that has already been engaged during the current flight might not be engaged again thereafter.

If at least one calculation channel 50 has not been engaged during the current flight, said supervisor 60 couples such a calculation channel 50 with the piloted members 10. Where appropriate, the supervisor may couple the calculation channel that comes after the engaged channel in the stored ordered list of calculation channels.

The calculation channel 50 that is newly coupled to the piloted members 10 becomes the new engaged channel.

In contrast, when the supervisor 60 has decoupled all of the calculation channels 50 during a said current flight, the supervisor 60 may apply an emergency mode.

In a first alternative, the supervisor 60 is programmed itself to control the control members 30. For example, the supervisor generates orders to cause the aircraft 1 to hover, waiting for piloting from a remote unit 70 that is not present in the aircraft 1. Under such circumstances, a human pilot may make use of the remote unit 70 in order to control the aircraft remotely, for example.

In a second alternative, the supervisor 60 may control the piloted members 10 in order to follow a preprogrammed procedure, e.g. a procedure for landing on a stored base.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An autopilot system for an aircraft, the autopilot system comprising an onboard unit for mounting on board the aircraft, the onboard unit comprising at least one control member for controlling at least one piloted member of the aircraft so as to control a movement of the aircraft, wherein the onboard unit comprises:

a plurality of sets of sensors that are redundant and mutually independent, each set of sensors comprising sensors for evaluating a position of the aircraft and the movement of the aircraft;

a plurality of calculation channels that are redundant and mutually independent, each calculation channel being connected to the sensors of one of the sets of sensors and receiving data coming from those sensors; and a supervisor connected to the sensors of a set of sensors, the supervisor having a function of coupling at most one of the calculation channels to the at least one control member to form a coupled calculation channel, the coupled calculation channel being an engaged channel and generating control signals that are transmitted to control members as a function of received data, the supervisor having the function of decoupling the engaged channel from the control members when current behavior of the aircraft departs from a predetermined predicted behavior.

2. The autopilot system according to claim 1, wherein each set of sensors is connected to a single calculation channel or solely to the supervisor.

3. The autopilot system according to claim 1, wherein each set of sensors includes a positioning system for positioning the aircraft in a terrestrial reference frame, together with an inertial unit.

4. The autopilot system according to claim 1, wherein the autopilot system includes a remote unit that is not for mounting on board the aircraft, the remote unit having a computer in communication with the supervisor via a wireless link.

5. The autopilot system according to claim 4, wherein the remote unit includes a positioning device for determining the position and the movement of the onboard unit.

6. The autopilot system according to claim 4, wherein the supervisor is connected to the calculation channels and to the at least one control member.

7. An aircraft having at least one piloted member that controls a movement of the aircraft, wherein the aircraft includes an autopilot system according to claim 1, the onboard unit being on board the aircraft.

8. The aircraft according to claim 7, wherein the aircraft is an aircraft without an onboard pilot, there being no pilot on board the aircraft.

9. The aircraft according to claim 7, wherein piloted members comprise at least one of the following members: a motor; and an aerodynamic control surface that is movable relative to a reference frame of the aircraft.

10. The autopilot system according to claim 1, wherein each calculation channel has no need of any other calculation channel in order to operate.

11. An autopilot method using an autopilot system, the autopilot system comprising an onboard unit for mounting on board an aircraft, the onboard unit comprising:

at least one control member for controlling at least one piloted member of the aircraft so as to control a movement of the aircraft, wherein the onboard unit comprises:

a plurality of sets of sensors that are redundant and mutually independent, each set of sensors comprising sensors for evaluating a position of the aircraft and the movement of the aircraft;

a plurality of calculation channels that are redundant and mutually independent, each calculation channel being connected to the sensors of one of the sets of sensors and receiving data coming from those sensors; and a supervisor connected to the sensors of a set of sensors, the supervisor having a function of coupling at most one of the calculation channels to the at least one control member to form a coupled calculation channel, the coupled calculation channel being an engaged channel and generating control signals that are transmitted to control members as a function of received data, the supervisor having the function of decoupling the engaged channel from the control members when current behavior of the aircraft departs from a predetermined predicted behavior, the method performing the following steps during a current flight of the aircraft:

controlling progress of the aircraft using one of the calculation channels referred to as the engaged channel, the engaged channel being coupled to the piloted members in order to control the piloted members;

monitoring the current behavior of the aircraft relative to preprogrammed predicted behavior; and when the current behavior departs from the predicted behavior, decoupling with the supervisor the engaged channel from the piloted members, and providing at least one calculation channel has not been engaged during the current flight, coupling with the supervisor a calculation channel that has not been engaged during a flight with the piloted members, the calculation channel newly coupled to the piloted members becoming in turn the engaged channel.

12. The method according to claim 11, wherein the method comprises: determining with each set of sensors data including the position of the aircraft and movement parameters defining the movement of the aircraft, and determining with the supervisor a consolidated position and consolidated movement parameters by analyzing consistency of positions and the movement parameters supplied by the sensors of the sets of sensors.

13. The method according to claim 12, wherein the method includes a step of monitoring the current behavior by the supervisor using the consolidated position and the consolidated movement parameters.

14. The method according to claim 11, wherein the predicted behavior defines a path that is to be followed and limits for movement parameters that are not to be exceeded, the current behavior being found to depart from the predicted behavior when the aircraft no longer follows the path or when at least one of limit is no longer complied with.

15. The method according to claim 11, wherein once the supervisor has decoupled all of the calculation channels during the current flight, the supervisor applies an emergency mode by controlling control members in order to cause the aircraft to hover while waiting for piloting from a remote unit not present in the aircraft, the remote unit communicating with the supervisor in order to pilot the aircraft.

16. The method according to claim 11, wherein once the supervisor has decoupled all of the calculation channels, the supervisor controls piloted members in order to follow a preprogrammed procedure.

17. The method according to claim 11, wherein the current behavior is monitored by a remote unit situated away from the aircraft, the remote unit informing the supervisor if an engaged channel needs to be decoupled from control members.

18. The method according to claim 11, wherein the supervisor includes a hierarchical list of the calculation channels and the supervisor selects a calculation channel that is to become the engaged channel by using the hierarchical list.

* * * * *